3,151,993
PLANOGRAPHIC INKS CONTAINING ALUMINUM HYDROXIDE COATED KAOLINITE PARTICLES

Wayne M. Bundy, Westfield, N.J., assignor to Georgia Kaolin Company, a corporation of New Jersey
No Drawing. Filed Mar. 31, 1960, Ser. No. 18,872
2 Claims. (Cl. 106—20)

This invention relates to kaolinite pigments and methods for their preparation and particularly to a kaolinite pigment compatible with planographic inks and like organic materials.

There has for many years been a demand for a low priced extender for planographic inks and similar organic systems.

The planographic process includes all the processes of printing from flat, or slightly etched, surfaces, such as stone lithography, offset lithography, offset tint printing, etc., in which the surfaces have ink-receptive and ink-repellent areas. The principle underlying the various processes is that grease and water are mutually repellant. In the ordinary stone lithographing process, a special slab of acid-sensitive stone is carefully planed and smoothed to prepare it for the subject matter and the surface is made perfectly grease-free. The design may be drawn on the surface of the stone by means of a greasy crayon, or it may be transferred to the stone from a design or printed matter prepared upon a suitable transfer paper using a greasy ink. In the latter case the transfer paper is placed upon the stone and the design transferred by pressure. Thereafter, the surface of the stone is etched very slightly with dilute nitric acid, which acts only upon those portions of the stone which are not protected by the greasy ink. After etching, the stone is coated with a solution of gum arabic, which enters the pores of the stone and prevents further absorption, holding the greasy ink to the lines of the design and preventing it from spreading.

In ordinary lithographic printing, the surface of the printing stone must be dampened as well as inked for each impression, and the presses are equipped with special dampening rollers for this purpose. Frequently, a small amount of chromic or phosphoric acid or an acid salt such as ammonium acid phosphate, together with a little gum arabic, is added to the dampening solution (hereinafter called the "fountain solution") to etch the surface of the stone very slightly but continuously, to keep the lines sharp and to prevent them from being worn away rapidly. When the moistened stone is inked in the usual way, the ink adheres only to the greasy portion and is repelled from the dampened portion of the stone. The design is offset onto paper, as in the usual printing process.

Lithographic printing inks must be concentrated, since in this process it is impractical to deposit on the stone as large a volume of ink as is deposited in typographic printing. This necessitates the grinding of as much pigment as possible into the vehicle which will impart sufficient strength, lift and gripping qualities to the ink without, however, making the ink so viscous or giving it so much tack as to tear the paper or pull off the greasy design. Moreover, lithographic inks must not contain any substance which is soluble in or preferentially dispersible either in the dilute acids or water used to dampen the stone, or which will make the ink emulsify with these liquids. Otherwise the ink will bleed into the uninked portions of the printing surface and to be carried thence on to the printed sheets.

Clay has heretofore not been considered an efficient mineral pigment for such inks.

Clay minerals, because of their high surface charge density, have a high degree of hydrophily. This property tends to cause emulsification of inks in the aqueous solutions used for planographic processes. In addition, unmodified clays flocculate and promote high viscosity in media of low polarity.

I have discovered a treated clay pigment which may successfully be used in the foregoing described planographic printing processes. I have found that if kaolinite particles are coated with aluminum hydroxide they may be satisfactorily used for pigments in inks and similar organic systems, that their natural hydrophily is overcome and they are converted to an organophilic state.

The subject matter of the invention may perhaps be best understood by reference to the following examples.

EXAMPLE I

A kaolinite slurry of 30% solids concentration was prepared. Aluminum sulfate $[Al_2(SO_4)_3 \cdot 18H_2O]$ was added to the slurry in an amount equal to about 3% by weight on the kaolinite. The mixture was agitated for approximately 30 minutes to insure solution of all aluminum sulfate and maximal adsorption of aluminum cations by the clay. A 10% solution of ammonium hydroxide was added slowly to the agitating slurry until stabilization occurred at pH 7.5–9.0. Agitation was continued an additional 30 minutes to insure an even distribution of aluminum hydroxide on the clay surface. The slurry was filtered and washed carefully to remove all soluble salts. Drying was carried out at a maximum temperature of 120° C. The dried filter cake was subjected to mild pulverization.

The viscosity of the treated clay as against untreated clay was determined and appears in Table I.

Table I

| Clay | Medium | Percent Clay | Brookfield Viscosity Centipoises at 10 r.p.m.–25° C. |
|---|---|---|---|
| Untreated kaolinite | Polyester | 40 | 36,000 |
|  | Phenolic | 30 | 21,400 |
|  | Methyl-Methacrylate | 30 | 40,000 |
| Aluminum hydroxide tr. kaolinite | Polyester | 40 | 6,000 |
|  | Phenolic | 30 | 19,000 |
|  | Methyl-Methacrylate | 30 | 18,000 |

EXAMPLE II

A slurry of 30% kaolinite was prepared. Hydrochloric acid in an amount sufficient to adjust the pH of the slurry to about pH 2 was added to the slurry and stirred for approximately 30 minutes. A 10% solution of ammonium hydroxide was added slowly to the agitated slurry until stabilization occurred at pH 7.5. Agitation was continued an additional 30 minutes to insure an even distribution of aluminum hydroxide on the clay surface. The slurry was filtered, washed and dried below 120° C. The filter cake was then subjected to mild pulverization and tested for viscosity effects in resins as in Example I. The results were substantially the same as in Example I.

I have also found that for use as pigments in planographic inks the particle size of the clay minerals should be about 96% or more less than 2 microns in average spherical diameter. If the size increases beyond this, I find a marked increase in plate wear. Tests on plate wear gave the following results.

Table II

| Percent particles less than 2 microns: | Plate wear [1] |
|---|---|
| 83 | 17.2 |
| 94 | 12.2 |
| 96 | 6.2 |
| 100 | 3.5 |
| Standard Filler Formula | 4.7 |

[1] Milligrams of metal removed after 2,800 passes of inking pad over plate.

In order to determine the degree of water adsorption of ink pigments according to the present invention 100 milliliters of fountain solution was mixed with 50 grams of each test ink for 15 minutes. The fountain solution not absorbed by the ink formula was decanted and measured. The results appear in Table III.

*Table III*

| Ink Formula | | Milliliters of Fountain Solution Adsorbed |
|---|---|---|
| Percent Ink | Percent Filler | |
| 65 | 35 Aluminum hydrate | 10. |
| 45 | 55 Kaolinite treated as Example I | 8. |
| 45 | 55 Untreated kaolinite | Completely emulsifies. |

It is evident from the foregoing results that the kaolinite treated according to this invention had a far smaller adsorption rate than even aluminum hydrate alone whereas untreated kaolinite ink was completely useless and emulsified into the fountain solution.

While I have illustrated and described certain presently preferred embodiments and practices of my invention, it will be understood that the invention may be otherwise embodied within the scope of the following claims.

I claim:

1. A planographic ink comprising a planographic ink vehicle and kaolinite particles coated with aluminum hydroxide precipitated in situ at a pH between about 7.5 to 9.

2. A planographic ink composition as claimed in claim 1 in which the treated kaolinite is about 55% by weight.

References Cited in the file of this patent
UNITED STATES PATENTS

| | | |
|---|---|---|
| 2,307,239 | Rowland | Jan. 5, 1943 |
| 2,467,271 | Peer | Apr. 12, 1949 |
| 2,551,580 | Bond | May 8, 1951 |
| 2,915,475 | Bugosh | Dec. 1, 1959 |
| 2,935,463 | Secor et al. | May 3, 1960 |

OTHER REFERENCES

Mudd et al., Industrial Minerals and Rocks, published N.Y.C., 1949, Amer. Inst. Min. and Metallurgical Eng. (page 207).